W. N. HOWDEN.
REGISTER.
APPLICATION FILED JUNE 15, 1916.
1,245,344.
Patented Nov. 6, 1917.
2 SHEETS—SHEET 1.
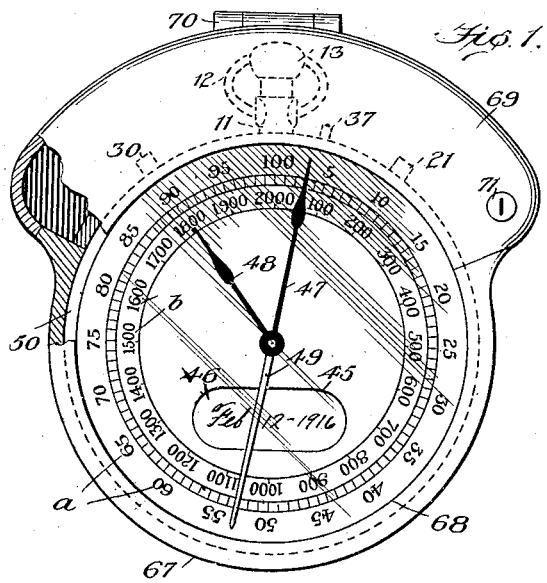
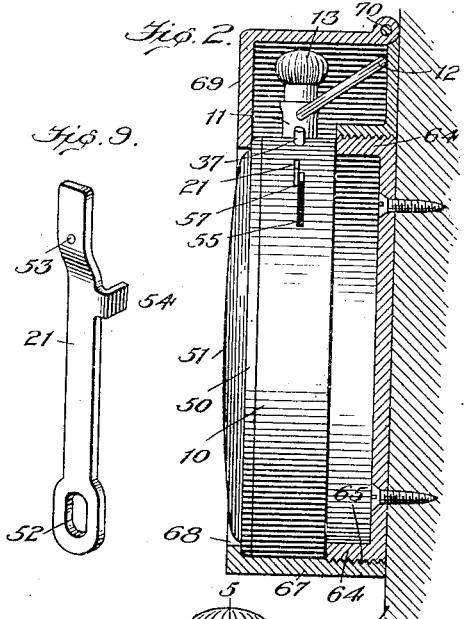
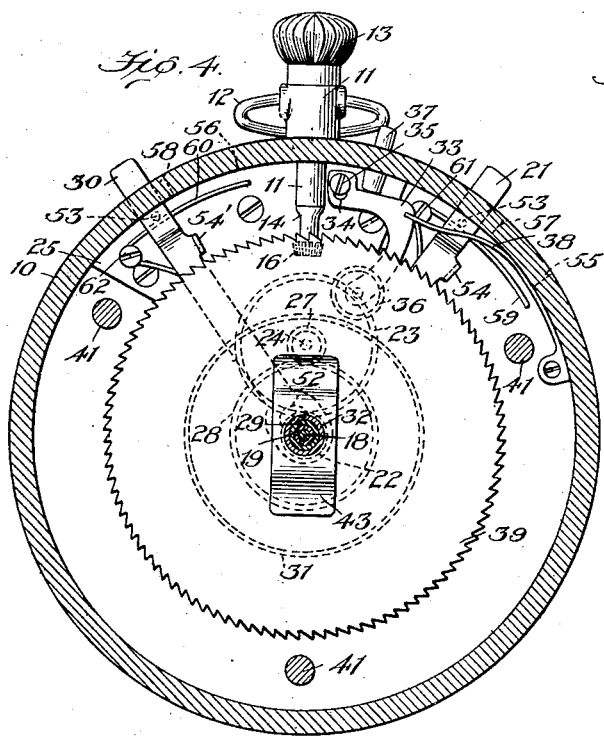
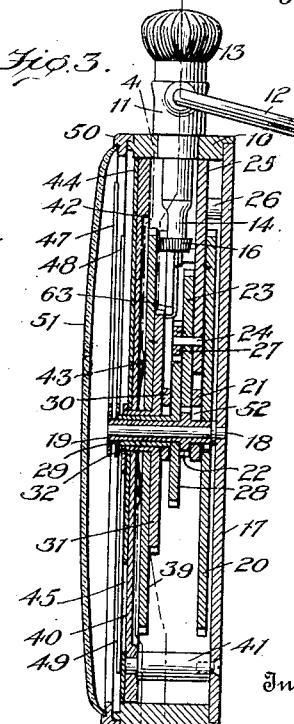
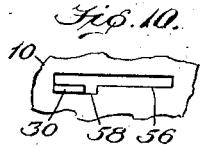
Witness
Edwin L. Bradford
Inventor
W. N. Howden,
By Wm. C. Dyre,
Attorney W. N. HOWDEN.
REGISTER.
APPLICATION FILED JUNE 15, 1916.
1,245,344.
Patented Nov. 6, 1917.
2 SHEETS—SHEET 2.
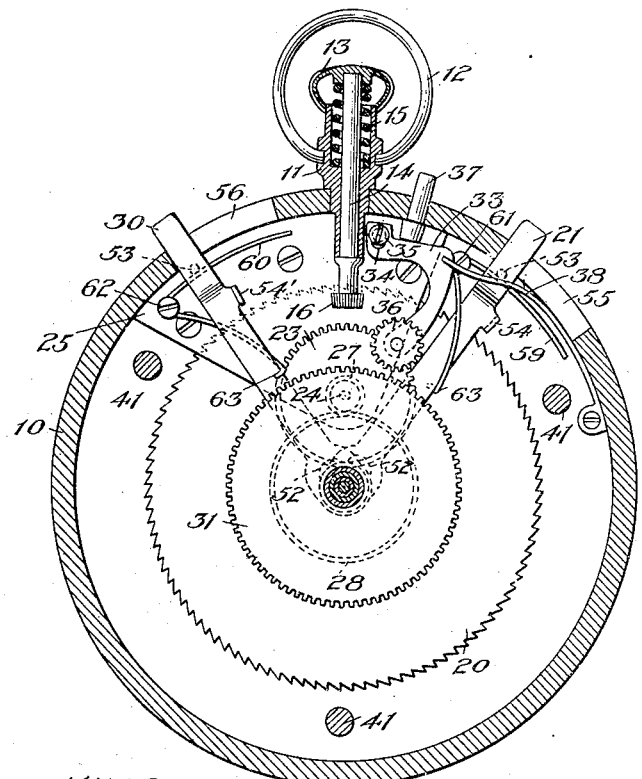
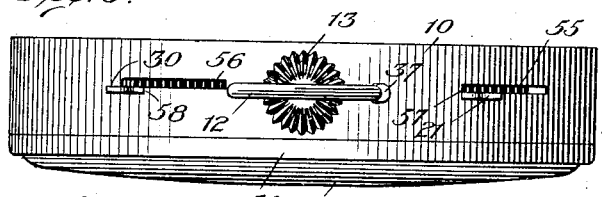
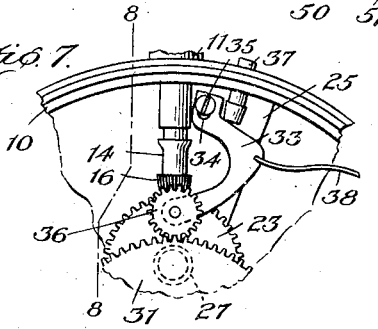
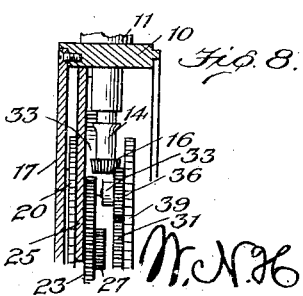

UNITED STATES PATENT OFFICE.

WILLIAM N. HOWDEN, OF SAN DIEGO, CALIFORNIA, ASSIGNOR, BY DIRECT AND MESNE ASSIGNMENTS, TO THE AUTO GAS REGISTER COMPANY, OF WATERBURY, CONNECTICUT, A CORPORATION OF CONNECTICUT.

REGISTER.

1,245,344.      Specification of Letters Patent.      Patented Nov. 6, 1917.

Application filed June 15, 1916. Serial No. 103,833.

*To all whom it may concern:*

Be it known that I, WILLIAM N. HOWDEN, a citizen of the United States, residing at San Diego, in the county of San Diego and State of California, have invented certain new and useful Improvements in Registers, and do hereby declare the following to be a full, clear, and exact description of the invention, such as will enable others skilled in the art to which it appertains to make and use the same.

My invention relates to registers or mechanical recorders, but more particularly to registers of compact and portable form, capable of being worn upon the person or carried in the pocket of a user, if desired.

It has for an object the production of novel and superior means for quickly and accurately registering totals or results, without the necessity of resorting to pencil or ink notations.

It has for a further object the construction and production of instruments of the character indicated, which are at once economical to manufacture, simple in arrangement, and highly efficient in the performance of their intended functions.

With the foregoing and other objects and advantages in view, it will be apparent that the present invention has a wide range of usefulness, being equally well adapted to register the purchase, acquisition or accumulation of any particular commodity; to indicate distances traveled, time consumed, moneys expended, or similar facts without limit. More particularly stated, however, the invention was designed primarily for use in connection with motor vehicles, and for registering cumulatively by gallons, the amount of gasolene supplied thereto.

The invention will be hereinafter particularly described and pointed out in the claims following.

In the accompanying drawings which form part of this application for Letters Patent, and whereupon like characters indicate corresponding parts in the several views:

Figure 1 is a front elevation of the invention including its outer casing or supporting inclosure.

Fig. 2 is a side elevation of same, showing the outer casing in vertical central section, and likewise means of attachment to the instrument board or dash of an automobile or motor boat.

Fig. 3 is a vertical central section through register, removed from its outer casing or supporting inclosure.

Fig. 4 is a transverse sectional view of register taken on the line 4—4, Fig. 3.

Fig. 5 is a similar view taken on the line 5—5, Fig. 3.

Fig. 6 is a top edge view of the invention removed from its outer supporting casing.

Fig. 7 is a fragmentary view showing in plan a shifting gear.

Fig. 8 is also a fragmentary detail view at right angles to Fig. 7 on line 8—8 thereof.

Fig. 9 is a detail view in perspective of one step-by-step actuating lever detached, and Fig. 10 is a fragmentary view in plan of one slot in the upper edge of the register case, for guiding and limiting the throw of one of the step-by-step actuating levers.

Reference being had to the drawings and characters thereon, the numeral 10 indicates a register-case similar in appearance and size to that of a watch, all figures, with exception of Figs. 1 and 2, being for the sake of clearness magnified about one and one-half diameters. Projecting through the top of this case in fixed relation is a pendant 11, provided with a bow 12 for attachment to a chain when desired, and surmounting this is a revoluble crown 13 affixed to a reciprocating stem 14, spring-pressed as at 15, to keep it normally withdrawn, the said stem projecting centrally through pendant 11 into case 10, where it is equipped with a slightly crowned spur wheel 16 as best shown by Fig. 5.

Forming part of the case 10 is a circular back-plate 17, from the center of which, and at right angles thereto, projects a central pivot pin 18, over which latter is next slipped a tubular arbor 19, having keyed to its inner end a ratchet wheel 20, and being loosely surrounded, adjacent to said wheel 20, by the inner end of a radially arranged step-by-step actuating lever 21 which will be hereinafter particularly described.

Surrounding said arbor 19, preferably as an integral part thereof, in a plane adjacent the said lever 21, is a pinion 22 constantly in mesh with a gear wheel 23, which latter is pivotally mounted as at 24, in a bridge-plate 25 projecting from above and suitably offset as at 26 from the back 17. Rotatably mounted upon the said pivot 24 and in fixed relation with the said gear wheel 23, is a spur wheel 27 training with a driven gear 28 rigidly affixed to, or forming part of, a sleeve 29, which latter loosely surrounds the aforesaid arbor 19, and like it extending practically to the front of the structure.

Loosely surrounding sleeve 29 in a plane next adjacent the aforesaid driven gear 28 is a second radially arranged independent step-by-step actuating lever 30, projecting at an angle of approximately forty-five degrees with relation to the corresponding lever 21 also for purposes which will hereinafter appear.

In a plane next adjacent the lever 30 is a driven gear 31 having a tubular bearing 32 loosely surrounding the sleeve 29 and projecting to the front of the structure. At this time it is convenient to introduce into case 10 an angular lever 33, pivotally mounted near the upper edge of bridge-plate 25 at one side of stem 14 by agency of an elongated bearing 34 and a pin 35 projecting from said plate. At its opposite or innermost end there is pivotally journaled upon said lever 33 and idler or shifting pinion 36, adapted at times to be manually interposed between the driving spur 16 on stem 14, and the driven gear 31 by a depression of push-pin 37, as indicated by Fig. 7, but normally retracted by agency of spring 38 as shown by Figs. 4 and 5.

Adjacent the gear 31 and secured thereto, or to its tubular bearing 32, by brazing or otherwise, is an outer ratchet wheel 39, corresponding with the before mentioned inner ratchet wheel 20, and for a similar purpose, that is to say, for imparting at times a step-by-step movement, in this instance to the said tubular bearing 32.

Outside of the ratchet wheel 39 is located a face-plate 40 suitably spaced and offset from back 17 by means of studs 41, and perforated centrally to permit passage of pin 18, arbor 19, sleeve 29 and tubular bearing 32 in concentric arrangement. And, as shown by Fig. 3, the inner surface of this face-plate 40 is recessed as at 42, to receive a centrally positioned tension spring 43, the edges whereof bear directly upon the surface of ratchet wheel 39, and through the latter upon all contacting parts to prevent overthrow of the operating train and pointers or indicating hands.

Upon face plate 40, and like it perforated centrally for the same purpose, is a dial 44, preferably of celluloid and provided with a transparent panel or an opening 45 through which, if desired, may be viewed a removable date card such as 46. Near its outer edge dial 44 is configured with degree marks in circular arrangement, and with unit-indicating numerals $a$, while in concentric relation there is also a second circle of such degree marks, and an appropriate arrangement of multiple-indicating numerals $b$.

In front of dial 44 are positioned pointers or indicating hands 47, 48 and 49 rigidly fixed, respectively, upon the protruding outer ends of the aforesaid arbor 19, sleeve 29, and tubular bearing 32, by which said hands may be rotated concentrically. Engaging the outer periphery of the case 10, and therefore surrounding the dial 44, is a bezel-ring 50 provided with a crystal 51, and secured as is customary in the art of watchmaking.

The actuating levers 21 and 30 hereinbefore mentioned, each have at their inner ends an elongated bearing 52, whereby a limited reciprocal movement is permitted. They also are provided near their opposite ends each with an inwardly projecting pin 53, and below the latter each is provided with a laterally projecting ratchet tooth or relatively fixed pawl reversely arranged, that numbered 54 upon the lever 21 projecting inwardly, and that numbered 54' upon lever 30 projecting outwardly into the paths of their respective ratchet-wheels 20 and 39. Continuing upward these levers 21 and 30 project from case 10 through slots 55 and 56, respectively, each of which is of double width at its extreme left as at 57 and 58.

The said levers 21 and 30, moreover, are each normally under control of independent springs 59 and 60 carried by screws 61 and 62, as best shown by Fig. 5. The free ends of these springs pass back of their respective levers and beneath their studs 53, thereby normally pressing them outward to the limit of slots 52, and laterally into the relatively short slots 57 and 58; while the opposite end of said springs 59 and 60 partially encircle their respective levers 21 and 30 as shown at 63, to normally hold them at the extreme left of their casing slots 57 and 58, and return them to this position after each operation.

The invention as thus far described may, if desired, be used as a pocket piece, or may be secured in any approved manner to the instrument board or dash of an automobile, motor boat or other vehicle, a most efficient fastening means being that illustrated by Figs. 1 and 2. Here, as will be seen, there is provided a circular coupling 64 screw-threaded upon its exterior as at 65 and secured to an instrument board 66 as shown. Upon the said coupling in screw-threaded relation is mounted an outer casing or supporting inclosure 67 for the entire structure, the register casing 10 first having been introduced stem first through a circular opening at the back of said outer casing until its crystal 51 projects through a corresponding front opening 68, as shown by Figs. 1 and 2. Upon the top of outer casing 67 is a hood 69 hinged to the body of the casing as at 70, and provided with a suitable lock 71 for use when desired to prevent unauthorized or accidental manipulation of the actuating means.

The present invention in one form of embodiment having been thus described, it should be understood that I consider myself by no means restricted to the particular arrangement and combination of parts shown and set forth; on the contrary, the structure may be variously modified in these and other respects without departing from the spirit of the invention, and to all such changes and modifications falling within the terms of the appended claims I lay claim the same as if herein set forth.

The operation may be briefly described as follows:

Presuming the instrument to be installed within its outer casing as indicated by Figs. 1 and 2 of the drawings, and that it is desired to actuate the indicating hands 47 and 48, or 49, or all of the said hands for registering purposes, as for example, in cumulatively registering with hands 47 and 48 the gallon quantities of gasolene purchased, and with the subsidiary hand 49 the quantity of lubricating oil obtained within a given period, or subsequent to any particular date as indicated upon the removable dating card 46:

Hood 69 is first opened or thrown back upon its hinge 70, so as to render the actuating means readily available. Pressure then applied radially to stem 14 causes its spur wheel 16 to engage and drive gear 23 meshing with the pinion 22, the latter forming part of tubular arbor 19 by which the long hand 47 is rotated, more or less, in a clockwise direction, thus indicating upon unit scale a the number of gallons. During this operation spur wheel 27, carried by the aforesaid gear 23, is also driven in mesh with the gear 28 rotating at a proportionally slow rate of speed upon the said arbor 19, and carrying upon its extended tubular bearing or sleeve 29 the short hand 48, also revolving in a clockwise direction to indicate upon multiple scale b hundreds of gallons, this hand 48 moving five degrees each time the unit hand 47 completes one cycle of one hundred degrees.

In lieu of stem 14 and coöperating parts, the said hand 47 and dependent hand 48 may be rotated through the same gear train, if desired, by agency of the step-by-step actuating lever 21, either one degree at a time or in multiples of five, as a convenient manner of registering in the dark when occasion or convenience requires, as follows:

Stem 14 being normally retracted as shown by Fig. 5, lever 21 is engaged by the finger of an operator, who depresses same longitudinally against the slight resistance of its spring 59, thus causing its tooth or pawl 54 to engage a tooth of ratchet wheel 20. Simultaneous movement of said lever 21 in clockwise direction to the limit of its slot 57, now rotates the said gear wheel 20 a distance of one tooth or one degree, unless in the meantime lever 21 has first been flexed against spring 59 into the communicating slot 55 of increased length representing a movement of five teeth or five degrees. In either event, however, the ratchet wheel 20 keyed to the arbor 19 advances the long indicating hand 47 the predetermined distance with each forward thrust of its lever 21, which latter is thereupon returned to its normal or starting position by action of the lower end 63 of its said spring 59. At the same time the gear train heretofore described driven by pinion 22 upon the said arbor 19 again automatically produces the proportional clockwise movement of the short multiple hand 48 for purposes heretofore set forth, or analogous uses.

When it is desired to actuate the subsidiary hand 49 this may be accomplished by depression of push-pin 37 operating upon angular lever 33 to interpose shifting-pinion 36 between crowned spur wheel 16 and the driven gear 31, as shown by Figs. 7 and 8. This gear 31 has a concentric tubular bearing 32 upon sleeve 29, around which it is free to rotate, carrying with it at its outer end, in clockwise direction, the aforesaid hand 49, used as an indicator in connection with either or both scales a and b. It will be particularly noted that the intermeshing of pinion 36 and gear 31 is greatly facilitated by the elongated character of bearing 34 by which the angular lever 33 is supported. In other words, when these elements fail to instantly intermesh by reason of engagement tooth upon tooth, the play of lever 33 in bearing 34 amply provides for the necessary slippage and an immediate adjustment between the several intermeshing elements 31, 36 and 16.

If it becomes necessary or desirable because of darkness, or for any reason, to actuate the same subsidiary hand 49 step-by-step independently of stem 14 and its coöperating shifting-pinion 36, this is accomplished by agency of lever 30, corresponding with the lever 21 heretofore described and operating in like manner upon the teeth of its particular ratchet wheel 39 at the front of case 10. This wheel 39 affixed to gear 31 rotates the latter one degree or five according to the movement of lever 30 in its guiding and limiting slots 58 or 56 (Fig. 10), imparting a proportional movement to the aforesaid concentric tubular bearing 32, and hand 49 affixed to the end thereof.

Obviously, the operations hereinbefore described may be continued and repeated almost indefinitely, or the several indicator hands may be reset if desired by a reversal of the stem actuated means described in connection with both sets of hands. It will be noted also that after each setting or indicating operation the hood 69 is replaced as shown, and may there be locked, if desired, over the actuating means by agency of the safety lock 71, the construction of outer casing 67 being such as to render impossible the removal of case 10 in any manner other than through the back of said outer casing after same has been removed from coupling 64.

Having thus described my invention, what I now claim and desire to secure by Letters Patent is:

1. In a register of the class described the combination with a suitable casing provided with a dial and with main and subsidiary indicating hands of means for rotating said hands including a gear train for each, a normally retracted driving spur wheel adapted to be projected into engagement with one of said trains, and a shifting pinion adapted to be interposed between said driving spur and the other of said trains.

2. In a register of the class described the combination with a suitable casing, dial and indicating hand, of means for rotating said hand, including a driven gear, a stem-actuated driving spur, a lever pivotally mounted within said casing upon an elongated bearing, and a shifting pinion carried by the free end of said lever arranged and adapted to be manually interposed between said driving spur and driven gear.

3. In a register of the class described the combination with a suitable casing, dial and indicating hand, of means for rotating said hand, including a driven gear, a stem-actuated driving spur, a lever pivotally mounted within said casing upon an elongated bearing, a shifting pinion carried by the free end of said lever, a push-pin projecting from the register casing and bearing upon the lever aforesaid to manually interpose said shifting pinion between its driving spur and driven gear, and a spring for normally holding said shifting pinion out of mesh.

4. In a register of the class described the combination with a suitable casing, a dial, and indicating hands, of means for rotating said hands including a ratchet wheel operatively connected with said hands, a radially reciprocating actuating lever provided with a push-pawl for engaging the teeth of said ratchet wheel, and a suitable spring for normally holding said actuating lever in its outermost position and also at its starting point.

5. In a register of the class described the combination with a suitable casing, a dial, and indicating hands, of means for rotating said hands including a ratchet wheel operatively connected with said hands, a radially reciprocating actuating lever having an elongated bearing positioned centrally of the register and provided with a pawl for engaging the teeth of said ratchet wheel, and a suitable spring for normally holding said actuating lever in its outermost position and also at its starting point.

In testimony whereof I affix my signature, in presence of two subscribing witnesses.

WILLIAM N. HOWDEN.

Witnesses:
JOHN O'BRIEN,
F. W. E. MESHAC.